United States Patent
Willenegger et al.

(10) Patent No.: US 6,721,349 B1
(45) Date of Patent: Apr. 13, 2004

(54) METHOD AND APPARATUS FOR REDUCING PEAK-TO-AVERAGE RATIO IN A CDMA COMMUNICATION SYSTEM

(75) Inventors: Serge Willenegger, Onnens (CH); Jack M. Holtzman, San Diego, CA (US); Abhijit Shanbhag, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/239,449

(22) Filed: Jan. 28, 1999

(51) Int. Cl.$^7$ .................................. H04B 1/69

(52) U.S. Cl. ........................ 375/130; 375/146

(58) Field of Search .............. 375/130, 146, 375/298, 285, 295; 370/206, 208, 209, 335, 342

(56) References Cited

U.S. PATENT DOCUMENTS

| | | | |
|---|---|---|---|
| 4,901,307 A | 2/1990 | Gilhousen et al. | 370/18 |
| 5,056,109 A | 10/1991 | Gilhousen et al. | 375/1 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,309,474 A | 5/1994 | Gilhousen et al. | 375/1 |
| 5,329,547 A | 7/1994 | Ling | 375/1 |
| 5,381,449 A * | 1/1995 | Jasper et al. | 375/295 |
| 5,416,797 A | 5/1995 | Gilhousen et al. | 375/705 |
| 5,418,813 A | 5/1995 | Schaffner et al. | 375/205 |
| 5,442,625 A | 8/1995 | Gitlin et al. | 370/18 |
| 5,467,367 A | 11/1995 | Izumi et al. | 375/206 |
| 5,471,497 A * | 11/1995 | Zehavi | 375/130 |
| 5,485,486 A | 1/1996 | Gilhousen et al. | 375/205 |
| 5,550,809 A | 8/1996 | Bottomley et al. | 370/18 |
| 5,566,164 A | 10/1996 | Ohlson | 370/18 |
| 5,604,730 A | 2/1997 | Tiedemann, Jr. | 370/252 |
| 5,619,526 A | 4/1997 | Kim et al. | 370/335 |
| 5,623,485 A | 4/1997 | Bi | 370/209 |
| 5,644,590 A | 7/1997 | Sugita | 375/200 |
| 5,699,380 A | 12/1997 | Sugita | 375/208 |
| 5,712,869 A * | 1/1998 | Lee et al. | 375/206 |
| 5,737,326 A | 4/1998 | I et al. | 370/335 |

(List continued on next page.)

FOREIGN PATENT DOCUMENTS

| | | |
|---|---|---|
| EP | 0851601 | 7/1998 |
| WO | 9503652 | 2/1995 |
| WO | 9745970 | 12/1997 |
| WO | 9747098 | 12/1997 |
| WO | 9818217 | 4/1998 |
| WO | 0013337 | 3/2000 |

OTHER PUBLICATIONS

Comer D. E. Et al.: "A Rate–Based Congestion Avoidance And Control Scheme For Packet Switched Networks," Proceedings of the International Conference on Distributed Computing Systems, US, Los Alamitos, IEEE Comp. Soc. Press, (1990).

Primary Examiner—Temesghen Ghebretinsae
(74) Attorney, Agent, or Firm—Russell B. Miller; Christopher Edwards

(57) ABSTRACT

The present invention is a novel and improved method and apparatus for reducing peak to average ratio in a system using auxiliary pilot channels as described in the TIA/EIA TR45.5 "cdma2000 ITU-R RTT Candidate Submission" to the ITU for consideration in the third generation wireless communication systems. A first method proposed in the present invention to deal with the above stated problem is to alter the phase of the auxiliary pilot channels to reduce to prevent the auxiliary pilot channels from adding constructively. A second method proposed in the present invention to deal with the above stated problem is to gate out the portion of the auxiliary pilot channels that add constructively. The present invention also proposes a novel demodulator design for receiving signals using the modified auxiliary pilot signals.

22 Claims, 8 Drawing Sheets

U.S. PATENT DOCUMENTS

| | | |
|---|---|---|
| 5,793,797 A | 8/1998 | Giallorenzi et al. |
| 5,812,543 A | 9/1998 | Sugita ........................ 370/335 |
| 5,914,950 A | 6/1999 | Tiedemann, Jr. et al. ... 370/348 |
| 5,920,552 A | 7/1999 | Allpress et al. ............. 370/335 |
| 5,926,500 A | 7/1999 | Odenwalder ................ 375/200 |
| 5,930,230 A | 7/1999 | Odenwalder et al. ....... 370/208 |
| 6,044,103 A * | 3/2000 | Weaver, Jr. .................. 375/130 |
| 6,097,714 A * | 8/2000 | Nagatani et al. ............ 370/342 |
| 6,130,918 A * | 10/2000 | Humphrey et al. ......... 375/295 |
| 6,310,869 B1 * | 10/2001 | Holtzman et al. ........... 370/335 |

* cited by examiner

FIG. 11A  q_1 q_2 q_3 q_4 q_5 q_6 q_7 q_8 q_9 q_10 q_11 q_12 q_13 q_14 q_15 q_16 q_17 q_18 q_19 q_20 q_21 q_22 q_23 q_24 q_25 q_26 q_27 q_28 q_29 q_30 q_31 q_32
FIG. 11B  $W_{32}$
FIG. 11C  $W_{16}$, $W_{16}$
FIG. 11D  $W_8$, $W_8$, $W_8$, $W_8$
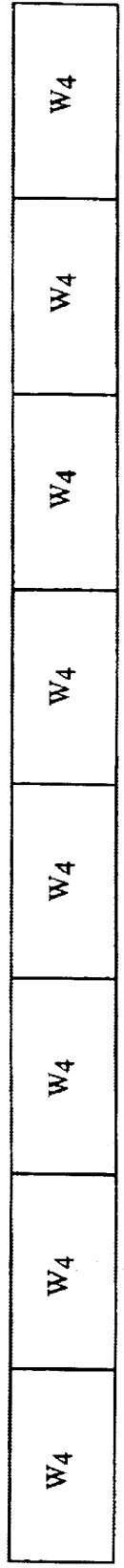
FIG. 11E  $W_4$, $W_4$, $W_4$, $W_4$, $W_4$, $W_4$, $W_4$, $W_4$

METHOD AND APPARATUS FOR REDUCING PEAK-TO-AVERAGE RATIO IN A CDMA COMMUNICATION SYSTEM

BACKGROUND OF THE INVENTION

I. Field of the Invention

The present invention relates to communications. More particularly, the present invention relates to a novel and improved method and apparatus for reducing peak to average ratio in code division multiple, access communication systems.

II. Description of the Related Art

The use of code division multiple access (CDMA) modulation techniques is one of several techniques for facilitating communications in which a large number of system users are present. Although-other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. The CDMA system can be designed to conform to the "TIA/EIA/IS-95 Mobile Station-Base Station Compatibility Standard for Dual-Mode Wideband. Spread Spectrum Cellular System", hereinafter referred to as the IS-95 standard.

The CDMA system is a spread spectrum communication system. The benefits of spread spectrum communication are well known in the art and can be appreciated by reference to the above cited references. CDMA by its inherent nature of being a wideband signal, offers a form of frequency diversity by spreading the signal energy over a wide bandwidth. Therefore, frequency selective fading affects only a small part of the CDMA signal bandwidth. Space or path diversity is obtained by providing multiple signal, paths through simultaneous links to a mobile user or remote station through two or more base stations. Furthermore, path diversity may be obtained by exploiting the multipath environment through spread spectrum processing by allowing signals arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

In a CDMA system, the forward link refers to a transmission from a base station to a remote station. In the exemplary CDMA communication system which conforms to the IS-95 standard, forward link data and voice transmissions occur over orthogonal code channels. In accordance with the IS-95 standard, each orthogonal code channels is covered with a unique Walsh function which is 64 chips in duration. The orthogonality minimizes the interference between the code channels and improves performance.

CDMA systems offer higher system capacity, as measured by the number of supportable users, through several design features. First, the transmit frequency of adjacent cells can be reused. Second, increased capacity can be achieved by using more directive antennas for the transmission to some areas or to some remote stations. In the CDMA system, the coverage area (or cell) can be divided into several (e.g., three) sectors using directive antennas.

The method and apparatus for providing sectors in, a CDMA communication system is described in U.S. Pat. No. 5,621,752, entitled "ADAPTIVE SECTORIZATION IN A SPREAD SPECTRUM COMMUNICATION SYSTEM", assigned to the assignee of the present invention and incorporated by references herein. Each sector or cell can be further divided into more directive spot beams. Alternatively, spot beams can be assigned to selected remote stations or a set of remote stations within a sector or a cell. A picocell is a localized coverage area within a sector or a cell. The picocell can be embedded within a sector or a cell to improve capacity and provide additional services.

In the exemplary CDMA system, the forward link transmissions in different sectors typically use different short PN spreading sequences (or different offsets of a common set of short PN spreading sequences). Thus, when a remote station is in overlapping sector coverage areas and demodulating the signal from one sector, the signals from other sectors are spread and appear as wideband interference. However, the signals from other sectors or cells are not orthogonal to each other. The non-orthogonal interference from adjacent sectors or cells can degrade the performance of the communication system.

In an IS-95 CDMA communication system, a pilot channel is transmitted on the forward link to assist the remote station perform coherent demodulation of the received signal. Coherent demodulation results in improved performance. For each beam, a pilot channel is utilized. In accordance with the IS-95 standard, the pilot channel is covered with Walsh function zero.

A number of challenges arise when attempting to increase the capacity of the CDMA system. First, the Walsh functions available for covering the code channels is defined by the IS-95 standard and limited to 64. Second, a method is desired to allow the remote stations to distinguish the different beams, sectors, or picocells in CDMA systems with minimal signal processing. And third, maintaining conformance to the IS-95 standard is a desirable condition. The present invention addresses these challenges.

SUMMARY OF THE INVENTION

The present invention is a novel and improved method and apparatus for reducing peak to average ratio in a system using auxiliary pilot channels as described in the TIA/EIA TR45.5 "cdma2000 ITU-R RTT Candidate Submission" to the ITU for consideration in the third generation wireless communication systems. The inventors have discovered that use of the proposed auxiliary pilot channels results in a high peak to average ratio that has undesirable effect on system capacity. The problem that arises in using auxiliary pilot channels is that there is no data to modulate the pilot waveforms. Because of the data carried on each of the auxiliary pilots is identical, the pilot waveforms add constructively and result in high energy peaks in portions of the waveforms.

A first method proposed in the present invention to deal with the above stated problem is to alter the phase of the auxiliary pilot channels to prevent the auxiliary pilot channels from adding constructively. A second method proposed in the present invention to deal with the above stated problem is to gate out the portion of the auxiliary pilot channels that add constructively. The present invention also proposes a novel demodulator design for receiving signals using the modified auxiliary pilot signals.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 11A–11E illustrate the correlation properties between quasi orthogonal sequences and Walsh/functions of equal and shorter length.

DETAILED DESCRIPTION OF THE PREFERRED EMBODIMENTS

I. Introduction

In the present invention, two types of pilot channels are available to provide for coherent demodulation of the CDMA signals. The first type of pilot channel is the common pilot channel, which is available to assist in the demodulation of traffic channels by any mobile station in the sector. In the exemplary embodiment, the common pilot channel uses the Walsh(0) covering which is the all zeroes sequence. The common pilot Walsh function is of a length equal to the length of the Walsh functions covering the traffic channels.

Figure 1:
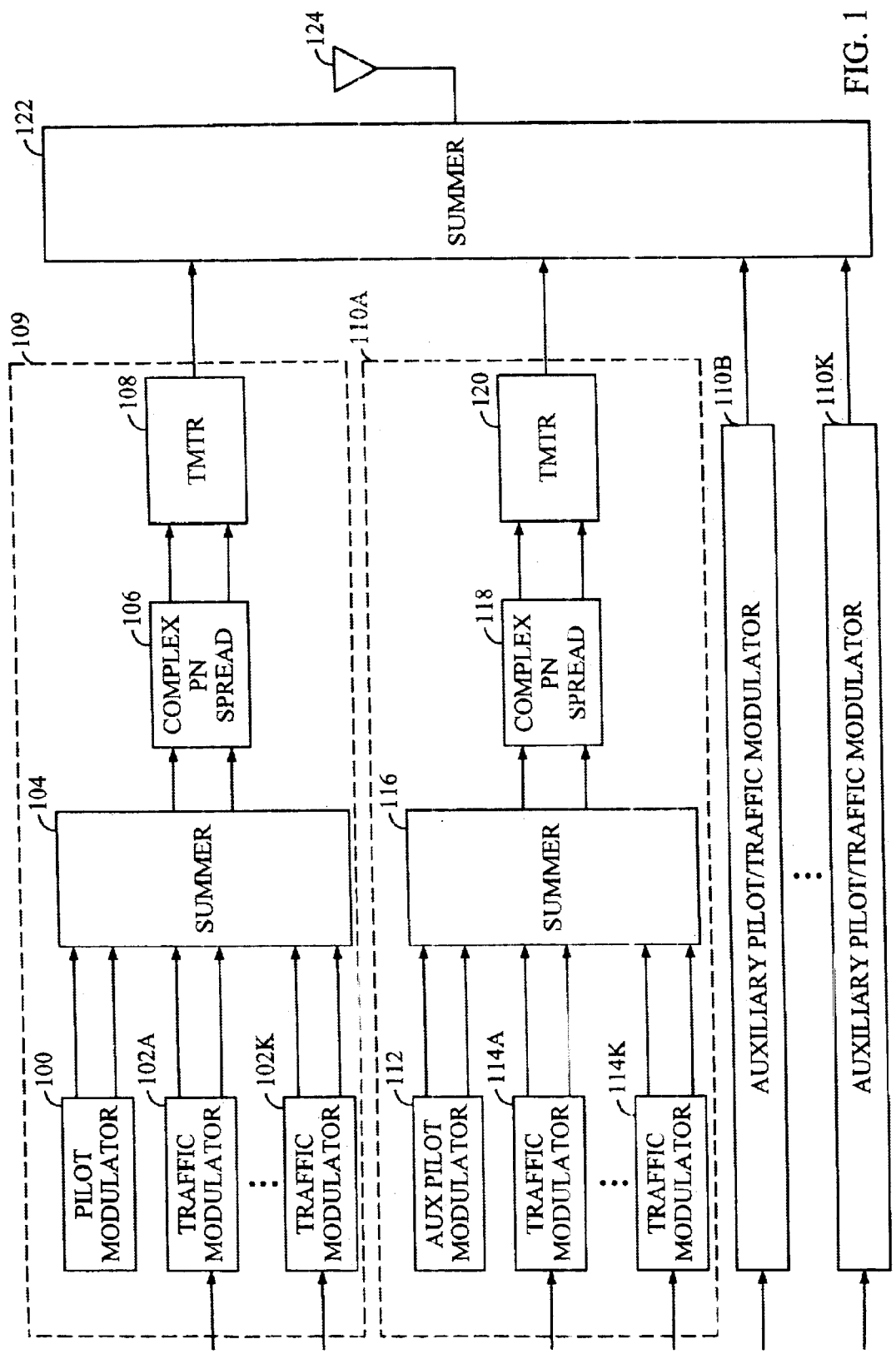
FIG. 1 is a block diagram of the base station transmitter of the present invention.

A second type of pilot channel that is transmitted by the base station sector illustrated in FIG. 1 is an auxiliary pilot sequence. The auxiliary pilot sequence is a pilot sequence that is constructed from a predetermined concatenation of a Walsh function and complements of the Walsh function. An application of auxiliary pilots is with antenna beam-forming applications to generate spot beams. Spot beams can be used to increase coverage towards a particular geographical point or to increase capacity towards highly congested areas (typically referred to as hot spots). The auxiliary pilots can be shared among multiple mobile stations in the same spot beam.

Code multiplexed auxiliary pilots are generated assigning a different Walsh code to each Auxiliary Pilot. This approach reduces the number of orthogonal codes available for traffic channels. The approach taken to alleviate this limitation is to expand the size of the Walsh code set used for Auxiliary Pilots. Since a pilot signal is not modulated by data, the pilot Walsh function length can be extended, thereby yielding an increased numbers of available Walsh codes.

Every Walsh code $W_i^m$ (where i is the index of the Walsh function and m is the length or equivalently the order of the Walsh function) can be used to generate N auxiliary Walsh codes, where N must be a power of $2(N=2^n$, is a nonnegative integer). A longer Walsh function is built by concatenating N times $W_i^m$, where each concatenated $W_i^m$ may have different polarity. The sequence of polarity must be selected to generate N additional orthogonal Walsh functions of order N*m.

In the exemplary embodiment, N is equal to four and the following 4 auxiliary Walsh codes of order 4*M from $W_i^m$:

$$W_i^m W_i^m W_i^m W_i^m, \overline{W_i^m} W_i^m \overline{W_i^m} W_i^m, \overline{W_i^m} \overline{W_i^m} W_i^m W_i^m, W_i^m \overline{W_i^m} \overline{W_i^m} W_i^m \quad (1)$$

Each of the N*m generated Walsh functions is orthogonal to all other $W_j^m$ (j≠i) Walsh functions and therefore other traffic channels. All Walsh functions can be used except $W_0^m$, which will interfere with the common pilot if integrated over a shorter time that the extended Walsh length N*m. Walsh $W_i^m$ used to generate Auxiliary Pilots cannot be used by another traffic channel. The limit of extending the Walsh function by N is constrained by the necessity to have a stationary channel of the extended Walsh period N*m. A method for generating auxiliary pilots in this fashion and for demodulating traffic channels with the aid of auxiliary pilot channels is described in detail in copending U.S. patent application Ser. 08/925,521, entitled "Method and Apparatus for Providing Orthogonal Spot Beams, Sectors and Picocells", which was filed on Sep. 8, 1997, is assigned to the assignee of the present invention and incorporated by reference herein.

The problem that arises in using auxiliary pilot channels is that there is no data to modulate the pilot waveforms. Because of the data carried on each of the auxiliary pilots is identical, the pilot waveforms add constructively and result in high energy peaks in portions of the waveforms. First, observe that when the all four of the auxiliary waveforms described in equation (1) are transmitted with the same power, the resultant waveform takes the form of a string of 3*m zeroes (three Walsh functions in length) followed by a peak of $4*W_i^m$. Moreover, all Walsh functions begin with a chip value of one. Thus, when more auxiliary pilots are added based on other Walsh functions $W_j^m$, then the first chip of the Nth Walsh function will add constructively in the 3*m+1 bit position of the auxiliary pilot.

FIG. 1 illustrates a sector of a base station of the present invention. The sector illustrated in FIG. 1 provides for transmission of CDMA signals with accompanying pilot channels that allow for coherent demodulation of the signals by means of an accompanying pilot channel. In the base station sector of FIG. 1, both common pilot channel and auxiliary pilots-generated in the fashion described previously are transmitted.

Common pilot and traffic channel modulator 109 generates a common pilot channel and plurality of traffic channels that can be coherently demodulated with the aid of the common pilot channel. Auxiliary pilot and traffic channel modulators 110 generate auxiliary pilot channels that are used to coherently demodulate a set of traffic channels. In the exemplary embodiment, each of the pilot and accompanying traffic signals are individually processed through amplification and upconversion to allow for maximum flexibility in the use of beam steering and other applications. It will be understood by one skilled in the art that in an alternative implementation, the summation performed individually by summers 104 and 116 could be performed by a single summer.

In common pilot and traffic channel modulator 109, pilot symbols are provided to pilot modulator 100. In the exemplary embodiment, pilot modulator 100 modulates the pilot symbols in accordance with Walsh function $W_0^m$. In the exemplary embodiment, the pilot symbols are an all zeroes sequence. Traffic data is provided to each of traffic modulators 102. Each of traffic modulators 102 modulates the traffic data in accordance with a uniquely dedicated Walsh function ($W_T$). The modulated data from each of traffic modulators 102 and the pilot signal from common pilot modulator 100 are summed in summer 104 and provided in two streams of data to complex PN spreading element 106. Complex PN spreading element 106 performs a complex PN spreading on the data in accordance with the equations:

$$I = PN_I I' + PN_Q Q' \quad (2)$$

$$Q = PN_I I' - PN_Q Q', \quad (3)$$

Where I' is first data stream into complex PN spreading element 106 and Q' is the second data stream into complex PN spreading element 106. Complex PN spreading is used to evenly distribute the transmission energy to the in-phase and out of-phase components of the transmitted QPSK signal. Complex PN spreading is well known in the art and is described in detail in copending U.S. patent application Ser. No. 08/856,428, filed May 14,1997, entitled. "REDUCED PEAK-TO-AVERAGE TRANSMIT POWER HIGH DATA RATE IN A CDMA WIRELESS COMMUNICATION SYSTEM", the disclosure of which is assigned to the assignee of the present invention and incorporated by reference herein. The present invention is equally applicable to the use of other modulation formats such as BPSK and QAM. The complex PN spread data streams are then provided to transmitter 108 which upconverts, filters and amplifies the PN spread data streams and provides the resulting signals to summer 122.

In auxiliary pilot and traffic channel modulator 110a, pilot symbols are provided to auxiliary pilot modulator 112. Auxiliary pilot modulator 110a modulates the pilot symbols in accordance with an auxiliary pilot sequence generated as described in equation (1) above. In the exemplary embodiment, the pilot symbols are an all zeroes sequence. Traffic data is provided to each of traffic modulators 114. Each of traffic modulators 114 modulates the traffic data in accordance with a dedicated Walsh function. The modulated data from each of traffic modulators 114 and the pilot signal from auxiliary pilot modulator 112 are summed in summer 116 and provided in two streams of data to complex PN spreading element 118. Complex PN spreading element 118 spreads the data as described above in equations (2) and (3). The PN. spread symbols streams from complex PN spreader 118 are provided to transmitter (TMTR) 120. Transmitter 108 up converts, filters and amplifies the signal and provides the resultant signal to summer 122. Auxiliary pilot and traffic channel modulators 110b–110k operate as described with respect to auxiliary pilot and traffic channel modulator 110a.

The signals from auxiliary pilot and traffic channel modulators 110a–110k and the signals from common pilot and traffic channel modulator 109 are summed in summer 122. The resultant summed signal is transmitted through antenna 124.

Figure 2:
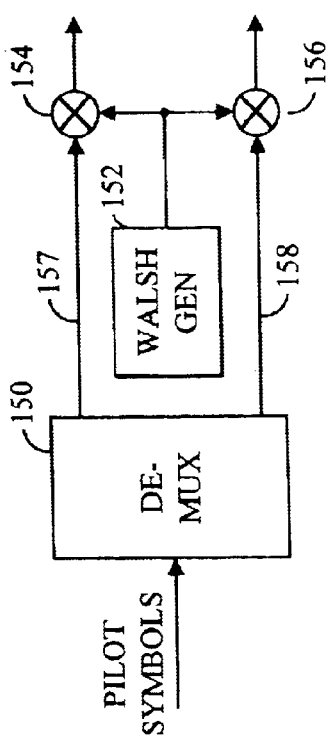
FIG. 2 is a block diagram of the common pilot channel modulator of the present invention.

FIG. 2 illustrates the exemplary embodiment of common pilot modulator 100. Pilot symbols, which in the exemplary embodiment are the all zeroes sequence are provided to de-multiplexer 150. De-multiplexer 150 maps the input pilot symbols into a four point constellation consisting of the points (1,1), (1,−1), (−1,1) and (−1,−1) and outputs the mapped sequence onto two outputs 157 and 158. The symbol streams on outputs 157 and 158 are provided to orthogonal covering elements 154 and 156. Walsh generator 152 generates the orthogonal covering sequence. In the exemplary embodiment, the Walsh covering sequence is Walsh(0). The symbol streams from de-multiplexer 150 are provided to orthogonal covering elements 154 and 156 and are spread by the covering sequence generated by Walsh generator 152.

Figure 3:
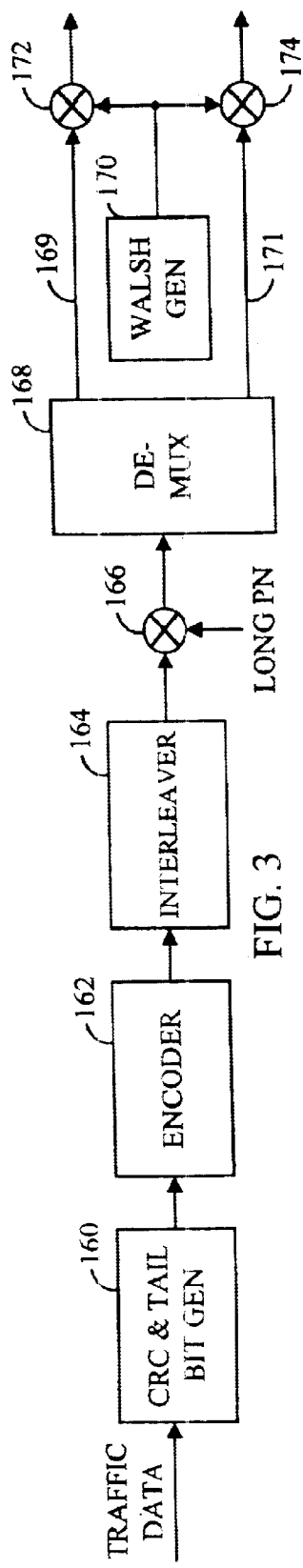
FIG. 3 is a block diagram of the traffic channel modulator of the present invention.

FIG. 3 illustrates the exemplary embodiment of traffic modulators 102 and 114. Traffic data is provided to CRC and Tail bit generator 160, which generates a set of cyclic redundancy check (CRC) bits and tail bits by methods well known in the art and appends the CRC and tail bits to the traffic data. The bits from CRC and Tail bit generator 160 are provided to encoder 162. Encoder 162 provides forward error correction processing on the traffic data and appended CRC and tail bits. The present invention contemplates various error correction coding methods such as convolutional encoding and turbo encoding. The encoded symbols are provided to interleaver 164, which reorders the symbols in accordance with a predetermined ordering format. The reordered symbols are provided to spreading element 166 which scrambles the data for security purposes using a pseudorandom sequence known only to the recipient mobile station and the transmitting base station.

The scrambled sequence from spreading element 166 is provided to de-multiplexer 168. De-multiplexer 168 maps the input pilot symbols into a four point constellation consisting of the points (1,1), (1,−1), (−1,1) and (−1,−1) and outputs the mapped sequence onto two outputs 169 and 171. The symbol streams on outputs 169 and 171 are provided to orthogonal covering elements 172 and 174. Walsh generator 170 generates the orthogonal covering sequence dedicated to transmissions to a specific mobile station user. The symbol streams from de-multiplexer 168 are provided to orthogonal covering elements 172 and 174 and are spread by the covering sequence generated by Walsh generator 170.

II. Phase Rotation to Reduce Peak to Average Ratio

Figure 4:
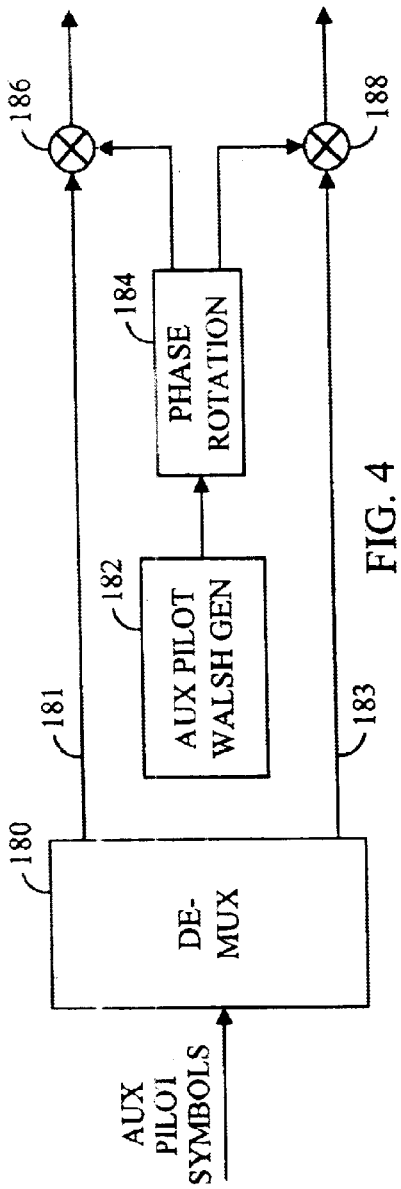
FIG. 4 is a block diagram of the first exemplary embodiment of the auxiliary pilot generator of the present invention.

FIG. 4 illustrates a first exemplary embodiment of auxiliary pilot modulator 100, which addresses the problem described above of bits in the auxiliary pilot channels adding constructively. Pilot symbols, which in the exemplary embodiment are the all zeroes sequence are provided to de-multiplexer 180. De-multiplexer 180 maps the input pilot symbols into a four point constellation consisting of the points (1,1), (1,−1), (−1,1) and (−1,−1) and outputs the mapped sequence onto two outputs 181 and 183. The symbol streams on outputs 181 and 183 are provided to orthogonal covering elements 186 and 188. Auxiliary pilot Walsh generator 182 generates the orthogonal covering sequence as described in equation (2) above and provides the. orthogonal spreading sequence to phase rotation element 184.

Phase rotation element 184 rotates the auxiliary pilot spreading sequence by a predetermined phase value. In the exemplary embodiment, phase rotation element, rotates the phase of the auxiliary pilot spreading sequence by 0° or 180°. That is to say that phase rotation element 184 either multiplies the covering sequence by 1 or by −1. The symbol streams from de-multiplexer 180 are provided to orthogonal covering elements 186 and 188 and are spread by the covering sequence from phase rotation element 184. By changing the sign of entire auxiliary pilot Walsh spreading function by either 1 or −1 the auxiliary pilot signals will not add constructively. Note the sign of the phase rotation must be communicated to the mobile stations using the auxiliary pilot to allow the mobile stations to coherently demodulate the traffic data.

Figure 6:
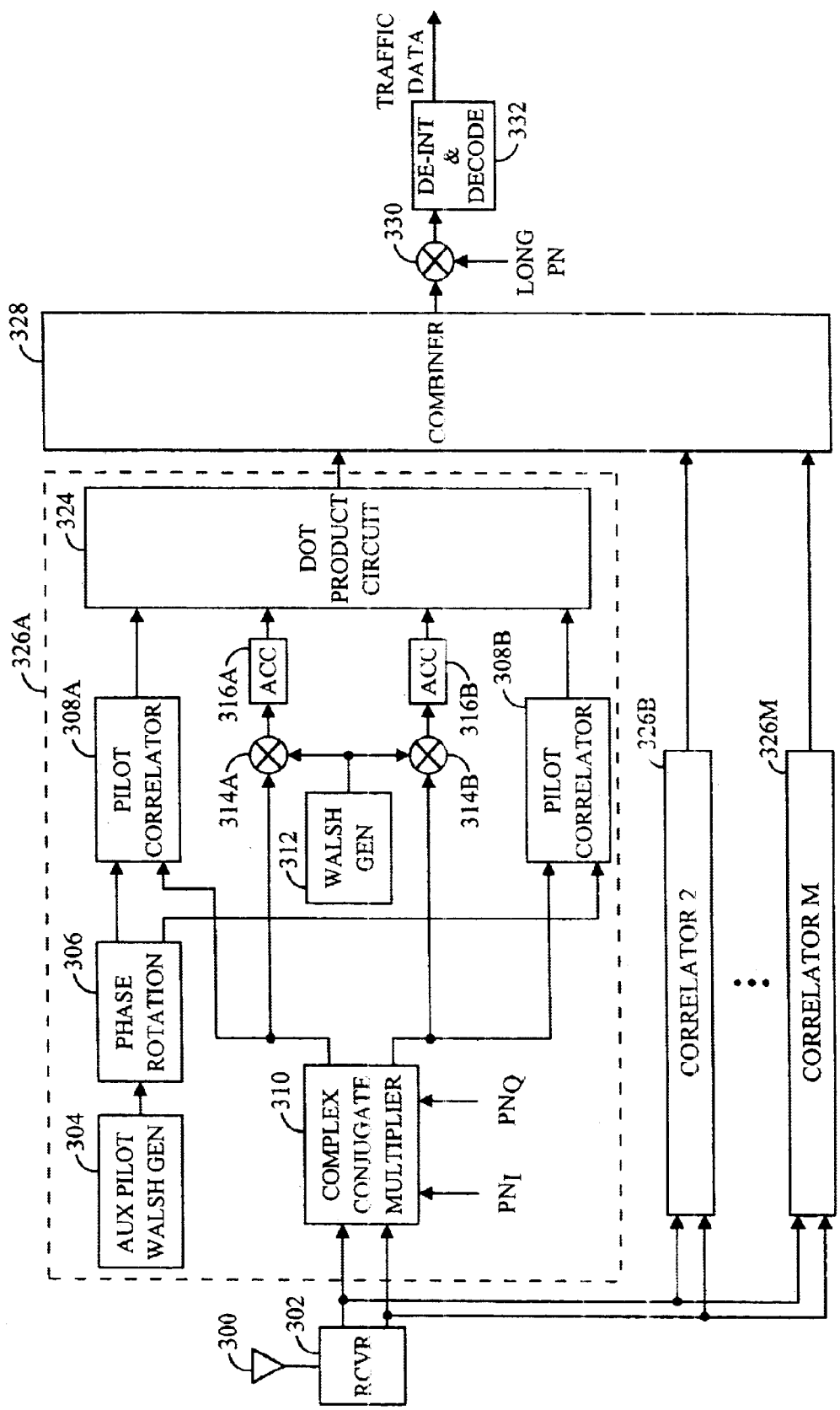
FIG. 6 is a block diagram of a receiver for receiving and coherently demodulating a signal using the modified auxiliary pilot channel generated as described with respect to FIG. 4.

FIG. 6 illustrates a receiver structure for receiving and coherently demodulating a traffic channel signal using an auxiliary pilot signal generated as described with respect to the auxiliary pilot generator of FIG. 4. The signals are received at antenna 300 and provided to receiver (RCVR) 302. Receiver 302 down converts, filters and amplifies the received signal in accordance with a QPSK demodulation format and provides the result to correlators 326 which demodulate the traffic channels coherently using the modified auxiliary pilot channel.

In correlator 326a, the received signal is provided to complex conjugate multiplier 310. Complex conjugate multiplier 310 multiplies the received signal by the pseudorandom noise sequences $PN_I$ and $PN_Q$ to PN despread the received signals. The despread signals are provided to pilot correlators 308a and 308b and to multipliers 314 and 318. Auxiliary pilot Walsh generator 304 and phase rotation element 306 operate to generate the modified auxiliary pilot sequence generated by auxiliary Pilot Walsh generator 182 and phase rotation element 184 of FIG. 4. Auxiliary pilot Walsh generator 304 generates the orthogonal covering sequence as described in equation (2) above and provides the orthogonal spreading sequence to phase rotation element 306. Phase rotation element 306 rotates the auxiliary pilot spreading sequence by a predetermined phase value. In the exemplary embodiment, phase rotation element, rotates the phase of the auxiliary pilot spreading sequence by 0° or 180°. That is to say that phase rotation element 306 either multiplies the covering sequence by 1 or by −1.

In pilot correlators 308a and 308b, the received signal is multiplied by the phase rotated pilot sequence and accumulated over the auxiliary pilot sequence length, the resultant despread pilot signal streams are provided to dot product circuit 324. Walsh generator 312 generates the Walsh traffic sequence used to cover the traffic data to the mobile station user. The Walsh traffic sequence is provided to multipliers 314a and 314b, which multiply the received signal streams by the Walsh traffic sequence. The product sequences from multipliers 314a and 314b are provided to accumulators 316a and 316b. Accumulators 316a and 316b accumulate the product sequences for the Walsh traffic interval. The resultant accumulated sequences are provided to dot product circuit 324.

Dot product circuit 324 computes the dot product between the despread pilot signals from pilot correlators 308a and 308b and the despread traffic data sequences from accumulators 316a and 316b to provide two scalar streams of data. The purpose of dot product circuit 324 is to remove phase errors that result from the signal propagation from the base station to the mobile station. The design and implementation of dot product circuit 324 is well known in the art and is described in detail in U.S. Pat. No. 5,506,865, entitled "PILOT CARRIER DOT PRODUCT CIRCUIT", which is assigned to the assignee of the present invention and incorporated by reference herein. In the exemplary embodiment, dot product circuit 324 outputs a single multiplexed symbol stream. In an alternative embodiment, this functionality could be distributed to two elements, one for performing the dot product computation and one for performing the multiplexing of the two resultant streams.

Correlators 326b–326m perform the same operation as described with respect to correlator 326a except that they operate on different multipath components of the received signal. The parallel demodulation of different propagation paths and combining of the resultant demodulated symbol streams is described in detail in the aforementioned U.S. Pat. Nos. 5,101,501 5,109,390. The demodulated signal estimates are provided to combiner 328 and are combined to provide an improved estimate of the received signal data. The improved signal estimate from combiner 328 is provided to despreader 330. Despreader 330 despreads the signal in accordance with a long PN code sequence that is known only to the mobile station user and the transmitting base station or base stations. The long PN despread signals are provided to de-interleaver and decoder 332. De-interleaver and decoder 332 reorders the symbols in accordance with a predetermined reordering format and decodes the reordered symbols in accordance with a forward error correction format such as Viterbi decoding or turbo decoding formats.

In a variant of the this present embodiment, the rotation can be based on a random sequence such as a pseudo noise sequence generated in conjunction with the mobile identification. Moreover, although the description above describes a static phase rotation of the auxiliary pilots, the phase rotation may be dynamic. In a dynamic rotation implementation, phase rotation element 184 would rotate the phase of the auxiliary pilot on a dynamic basis. In the exemplary embodiment, the phase of the auxiliary pilots is rotate on a frame by frame basis, although sets of frames or even intervals less than a frame are also possible. In this embodiment, the mobile station has knowledge of the pattern used to generate the phase rotation and that pattern is repeated in phase rotation element 306 in an identical fashion to the pattern of phase rotations generated in phase rotation element 184.

III. Gating of High Peak Energy Symbols

Figure 5:
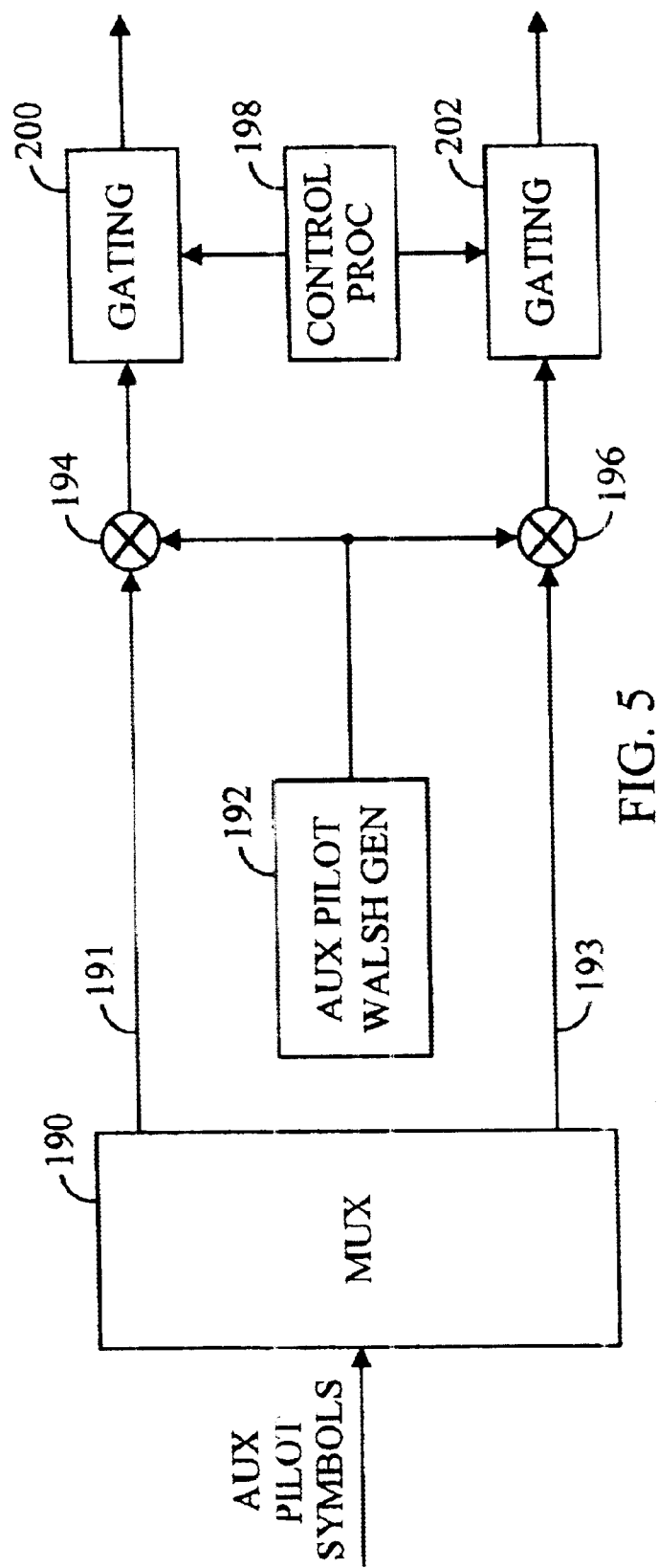
FIG. 5 is a block diagram of the second exemplary embodiment of the auxiliary pilo/generator of the present invention.

FIG. 5 illustrates a second exemplary embodiment of auxiliary pilot modulator 100, which addresses the problem described above of bits in the auxiliary pilot channels adding constructively. Pilot symbols, which in the exemplary embodiment are the all zeroes sequence are provided to de-multiplexer 190. De-multiplexer 190 maps the input pilot symbols into a four point constellation consisting of the points (1,1), (1,−1), (−1,1) and (−1,−1) and outputs the mapped sequence onto two outputs 191 and 193. The symbol streams on outputs 191 and 193 are provided to orthogonal covering elements 194 and 196. Auxiliary pilot Walsh generator 192 generates the orthogonal covering sequence as described in equation (2) above and provides the orthogonal spreading sequence to Walsh covering elements 194. The bit streams from de-multiplexer 190 are spread by the auxiliary pilot spreading sequence generated by auxiliary pilot Walsh generator 192.

The resultant spreading pilot symbols from spreading elements 194 and 196 are provided to gating elements 200 and 202. When the bit or bits that will add constructively are provided to gating elements 200 and 202, control processor 198 sends a signal to gating elements 200 and 202 which cause the gating elements to reduce the power of those auxiliary pilot symbols that add constructively. In the exemplary embodiment, the energy of the auxiliary pilot symbols that add constructively is reduced to zero.

Figure 7:
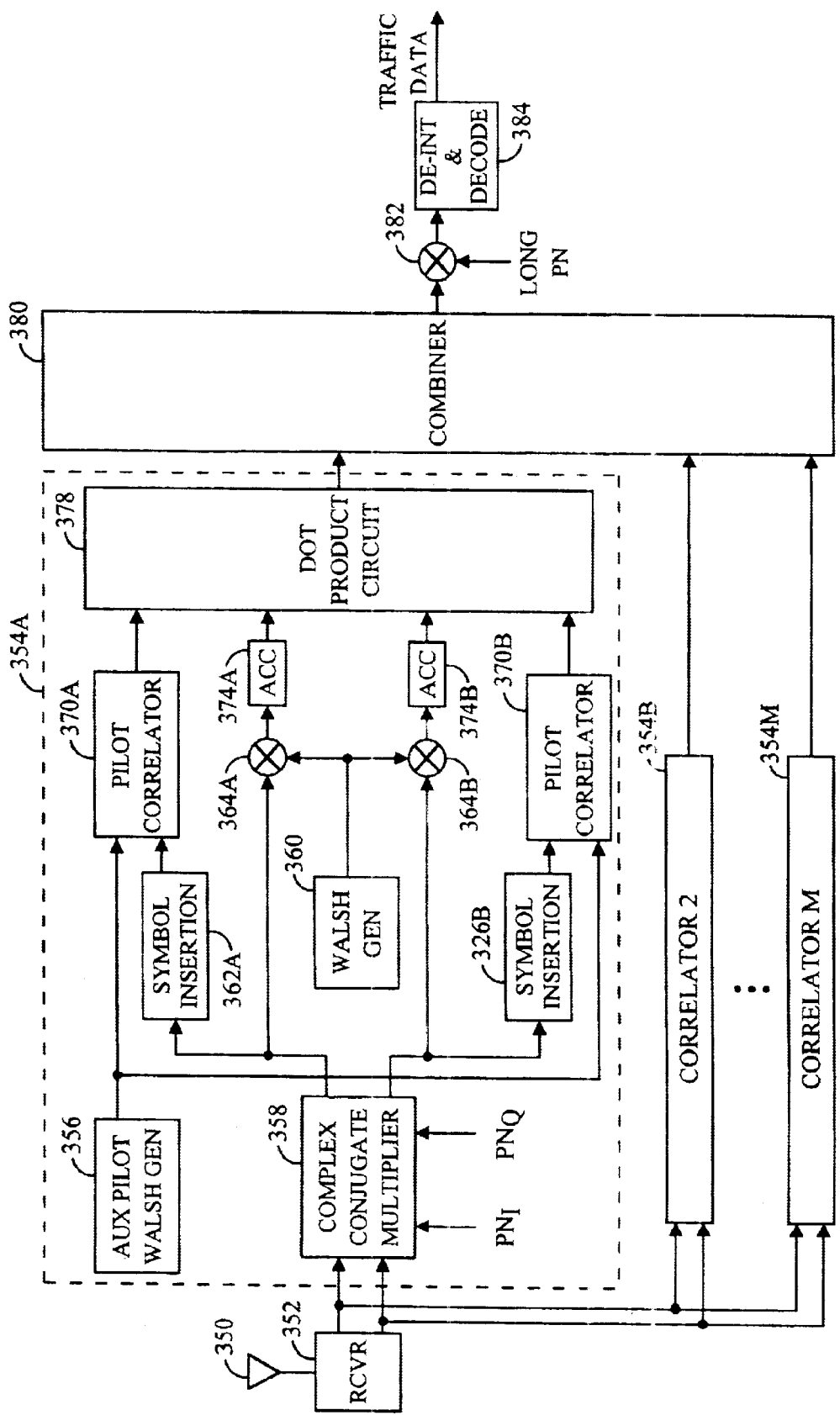
FIG. 7 is a block diagram of a receiver for receiving and coherently demodulating a signal using the modified auxiliary pilot channel generated as described with respect to FIG. 5.

FIG. 7 illustrates a receiver structure for receiving and coherently demodulating a traffic channel signal using an auxiliary pilot signal generated as described with respect to the auxiliary pilot generator of FIG. 5. The signals are received at antenna 350 and provided to receiver (RCVR) 352. Receiver 352 down converts, filters and amplifies the received signal and provides the received signal in accordance with a QPSK demodulation format and provides the result to correlators 354, which demodulate the traffic channels coherently using the modified auxiliary pilot channel.

In correlator 358a, the received signal is provided to complex conjugate multiplier 358. Complex conjugate multiplier 358 multiplies the received signal by the pseudorandom noise sequences $PN_I$ and $PN_Q$ to PN despread the received signals. The PN despread signals are provided to symbol insertion elements 362a and 362b and to multipliers 364a and 364b. Insertion elements 362a and 362b insert into the received data stream an estimate of the energy that was reduced by gating elements 200 and 202 of FIG. 5. The modified received signals are provided to pilot correlators 370a and 370b.

Auxiliary pilot Walsh generator 356 generates the orthogonal auxiliary pilot spreading sequence as described in equation (2) above and provides the orthogonal spreading sequence to pilot correlators 370a and 370b. In pilot correlators 370a and 370b, the modified received signals are multiplied by the auxiliary pilot sequence and accumulated over the auxiliary pilot sequence length, the resultant despread pilot signal streams are provided to dot product circuit 378. Walsh generator 360 generates the Walsh traffic sequence used to cover the traffic data to the mobile station user. The Walsh traffic sequence is provided to multipliers 364a and 364b which multiply the received signal streams by the Walsh traffic sequence. The product sequences from multipliers 364a and 364b are provided to accumulators 374a and 374b. Accumulators 374a and 374b accumulate the product sequences for the Walsh traffic interval. The resultant accumulated sequences are provided to dot product circuit 378.

Dot product circuit 378 computes the dot product between the despread pilot signals from pilot correlators 370a and 370b and the despread traffic data sequences from accumulators 374a and 374b to provide two scalar streams of data. The purpose of dot product circuit 378 is to remove phase errors that result from the signal propagation from the base station to the mobile station. The design and implementation of dot product circuit 378 is well known in the art and is described in detail in U.S. Pat. No. 5,506,865, entitled "PILOT CARRIER DOT PRODUCT CIRCUIT", which is assigned to the assignee of the present invention and incorporated by reference herein. In the exemplary embodiment, dot product circuit 378 outputs a single multiplexed symbol stream. In an alternative embodiment, this functionality could be distributed to two elements, one for performing the dot product computation and one for performing the multiplexing of the two resultant streams.

Correlators 354b–354m perform the same operation as described with respect to correlator 354a except that they operate on different multipath components of the received signal. The parallel demodulation of different propagation paths and combining of the resultant demodulated symbol streams is described in detail in the aforementioned U.S. Pat. Nos. 5,101,501 5,109,390. The demodulated signal estimates are provided to combiner 380 and are combined to provide an improved estimate of the received signal data. The improved signal estimate from combiner 380 is provided to despreader 382. Despreader 382 despreads the signal in accordance with a long PN code sequence that is known only to the mobile station user and the transmitting base station or base stations. The long PN despread signals are provided to de-interleaver and decoder 384. De-interleaver and decoder 384 reorders the, symbols in accordance with a predetermined reordering format and decodes the reordered symbols in accordance with a forward error correction format such as Viterbi decoding or turbo decoding formats.

IV. Phase Rotation Based on Quasi Orthogonal Vectors

In copending patent application Ser. No. 09/208,336, entitled "METHOD AND APPARATUS FOR THE TRANSMISSION AND CONSTRUCTION OF BINARY QUASI-ORTHOGONAL VECTORS", Dec. 9, 1998, assigned to the assignee of the present invention and incorporated by reference herein, a method for generating binary quasi orthogonal codes is disclosed. In copending patent application Ser. No. 09/136,107, entitled "METHOD AND APPARATUS FOR CONSTRUCTION OF QUASI-ORTHOGONAL VECTORS", filed Aug. 17, 1998, assigned to the assignee of the present invention and incorporated by reference herein, discusses a method for generating quaternary quasi-orthogonal vectors. Moreover, in a continuation-in-part application of U.S. patent application Ser. No. 09/136,107, Ser. No. 09/148,100, which is entitled "A METHOD AND APPARATUS FOR THE REFLECTION AND TRANSMISSION OF QUASI ORTHOGONAL VECTORS", filed Sept. 4, 1998, assigned to the assignee of the present invention and incorporated by reference herein, discusses the use of quasi orthogonal vectors in systems employing variable length Walsh functions is described. In particular, the aforementioned patent application shows that Quasi orthogonal vectors are maximally uncorrelated with variable length Walsh functions for sub-blocks of symbols selected from larger quasi-orthogonal vectors. The methodology for generating quasi-orthogonal vectors will be deferred until the end of this section to avoid distraction from the main thrust of the present invention which is to reduce the constructive addition of symbols in a communication system using auxiliary pilot channels. Any of the methods for generating quasi orthogonal vectors may be employed to minimize the constructive accumulation of auxiliary pilot symbols.

In the aforementioned patents applications, it was demonstrated that when one generates a quasi-orthogonal function of the form $Q_N$, it will be maximally uncorrelated with the Walsh functions of length N, where N is an integer of the form $2^n$. In addition, the aforementioned patent applications demonstrate that Walsh functions of lengths shorter than N are also maximally uncorrelated with sub-blocks of the quasi-orthogonal sequence.

Referring to FIGS. 11A–11E, the correlation properties of a quasi orthogonal sequence with relation to a Walsh function of equal length and Walsh functions of shorter length is illustrated. In FIG. 11A, a 32 symbol quasi orthogonal $Q_{32}$ comprising 32 symbols $q_1$–$q_{32}$ is illustrated. FIG. 11B illustrates a 32 symbol Walsh function ($W_{32}$). $Q_{32}$ is maximally uncorrelated over the set of all 32 symbol Walsh functions ($W_{32}$).

FIG. 11C illustrates two 16 symbol Walsh functions ($W_{16}$). The 16 symbol Walsh functions are maximally uncorrelated with two sub-blocks of $Q_{32}$. The first sub-block of $Q_{32}$ consists of the symbols $q_1$–$q_{16}$ and the second sub-block of $Q_{32}$ consisting of the symbols $q_{17}$–$q_{32}$. The two sub-blocks of $Q_{32}$ are maximally uncorrelated with the set of 16 symbol Walsh functions $W_{16}$.

FIG. 11D illustrates four 8 symbol Walsh functions ($W_8$). The 8 symbol Walsh functions are maximally uncorrelated with four sub-blocks of $Q_{32}$. The first sub-block of $Q_{32}$ consists of the symbols $q_1$–$q_8$, the second sub-block of $Q_{32}$ consists of the symbols $q_9$–$q_{16}$, the third sub-block of $Q_{32}$ consists of the symbols $q_{17}$–$q_{24}$ and the fourth sub-block of $Q_{32}$ consists of the symbols $q_{25}$–$q_{32}$. The four sub-blocks of $Q_{32}$ are maximally uncorrelated with the set of 8 symbol Walsh functions $W_8$.

FIG. 11E illustrates eight 4 symbol Walsh funtions ($W_4$). The 4 symbol Wash functions are maximally uncorrelated with eight sub-blocks of $Q_{32}$. The first sub-block of $Q_{32}$ consists of the symbols $q_1$–$q_4$, the second sub-block of $Q_{32}$ consists of the symbols $q_5$–$q_8$, the third sub-block of $Q_{32}$ consists of the symbols $q_9$–$q_{12}$, the fourth sub-block of $Q_{32}$ consists of the symbols $q_3$–$q_{16}$, the fifth sub-block of $Q_{32}$ consists of the symbols $q_{17}$–$q_{20}$, the sixth sub-block of $Q_{32}$ consists of the symbols $q_{21}$–$q_{24}$, the seventh sub-block of $Q_{32}$ consists of the symbols $q_{25}$–$q_{28}$, and the eighth sub-block of $Q_{32}$ consists of the symbols $q_{29}$–$q_{32}$. The eight sub-blocks of $Q_{32}$ are maximally uncorrelated with the set of 4 symbol Walsh functions $W_4$.

In this exemplary embodiment, each a set of four auxiliary pilots of length 4 m are generated from a Walsh function of length m ($W_m$) by means of appending the Walsh function ($W_m$) and complements of the Walsh function ($\overline{W}_m$) in the following fashion:

$$W_{m,1} = W_m\ W_m\ W_m\ W_m \quad (4)$$
$$W_{m,2} = W_m\ W_m\ \overline{W}_m\ \overline{W}_m$$
$$W_{m,3} = W_m\ \overline{W}_m\ W_m\ \overline{W}_m.$$
$$W_{m,4} = W_m\ \overline{W}_m\ \overline{W}_m\ W_m$$

If the auxiliary pilots, as defined in equations (4) above are placed into a matrix P, in the form:

$$P = \begin{bmatrix} W_{m,1} \\ W_{m,3} \\ W_{m,2} \\ W_{m,4} \end{bmatrix}. \quad (5)$$

The reason for providing the matrix P in the form given by equation (5) is that in this form each column of the matrix P is a Walsh function, If a vector A is defined containing the phase rotations for each of the vectors $a_i$ which represents the phase rotation of the auxiliar pilot $W_{m,i}$. Then determining the optimal phase rotation for reducing the peak to average ratio entails minimization of the sums of the elements for each column of the matrix AP given by:

$$AP = [a_1\ a_2\ a_3\ a_4] \begin{bmatrix} W_{m,1} \\ W_{m,3} \\ W_{m,2} \\ W_{m,4} \end{bmatrix} \quad (6)$$

Since the columns of matrix P are all Walsh functions then minimization of the sum of the columns of the matrix AP is simple a search for a vector A that is maximally uncorrelated with the Walsh functions represented by the columns of the matrix P. As was described above the vectors that is maximally uncorrelated with the set of Walsh functions are the quasi-orthogonal vectors or sub-blocks of a larger quasi-orthogonal vector. Thus, if there are eight auxiliary pilots that are in use, the optimum phase shifts to reduce symbol accumulation will be provided by the symbols of a quasi orthogonal vector of length eight or by an eight symbol sub-block of a larger quasi orthogonal vector.

Now, we turn our attention to the method for generating the quasi orthogonal vectors that have the correlation properties with Walsh functions. Quasi-orthogonal vectors are vectors that are in addition to the orthogonal vectors. Quasi orthogonal vectors are selected from the remaining code vectors in the total binary $2^n$ vector space in order to provide as little interference as possible with orthogonal vectors. Specifically, quasi-orthogonal vectors are selected to provide a level of interference that is within acceptable limits, even though the level of interference is not zero.

In order to select quasi-orthogonal vectors a computer search can be performed within the total $2^n$ vector space for binary (+1/–1 alphabet) masks. The masks can be applied to the orthogonal vectors to form a new set of vectors that are quasi-orthogonal vectors. Applying a total of M masks to a set of Walsh code vectors $w_n$, the number of quasi orthogonal functions produced is: (M+1) n. Applying a mask m to a code vector $w \in W_n$ includes a component by component multiplication of the mask m and the orthogonal code vector w to give the new code vector:

$$w_m = w \cdot m \quad (7)$$

The interference resulting from the use of the new code vectors can be tested and the code vectors that provide the lowest correlation can be selected to provide a set of quasi-orthogonal vectors. A plurality of such masking functions can be found in order to provide a plurality of sets of quasi-orthogonal vectors from a single set of orthogonal vectors. In order to permit message signals mixed with the quasi-orthogonal vectors found by the computer search to be separated from each other, the quasi-orthogonal vectors should be mutually orthogonal with respect to each other. There is a non-zero correlation between at least one code vector in the orthogonal set and one vector in the quasi-orthogonal set.

Representing the quasi-orthogonal vectors as v it can be shown that:

$$1/n \sum_{j=1}^{n} ((v,\ wj)^2) = \frac{1}{n}. \quad (8)$$

The goal in picking quasi orthogonal vectors v is to pick the vectors such that:

$$\max\ 1 \leq i \leq n\{|(\underline{v},\underline{w}_i)|\} \quad (9)$$

is as small as possible.

Since their correlation is a useful measure of the amount of separation between vectors, the normalized correlation between two code vectors $\underline{x}$ and $\underline{y}$ can be defined as:

$$(\underline{x},\ \underline{y}) = \frac{1}{n} \sum_{i=1}^{n} x_1 y_1^* \quad (10)$$

The correlation between two orthogonal vectors is zero. Lower absolute value of correlation results in better separation between message signals mixed with the orthogonal vectors and the ones mixed with quasi-orthogonal vectors. Better signal separation results in lower interference between the signals at the time of decoding.

The mean square correlation between orthogonal vectors and their corresponding quasi-orthogonal vectors where n is a power of two is $1/n$. The lower bound on the absolute value of correlation can be shown to have the value, $1/\sqrt{n}$. This quantity is referred to as the Holtzman lower bound. Masks have been found that meet the lower bound for cases wherein n is an even power of two. However, in cases where n is an odd power of two this bound has not been met with an equality. The lowest correlation found in the latter case is $\sqrt{2}/\sqrt{n}$. Therefore, the interference of the best quasi-orthogonal vectors found in the odd power of two case using the computer search technique is $\sqrt{2}$ times the theoretical limit.

In the signal transmission method of the present invention, masks m are constructed and applied to orthogonal code vectors in order to provide quasi orthogonal code vectors, wherein the masks are four phase or quaternary phase shift keying (QSPK) masks. Thus the masks m have an alphabet of four elements, $\{\pm 1, \pm j\}$, rather than two elements, where $j=\sqrt{-1}$ is the imaginary root of unity. It will be understood that the signal transmission method of the present invention can require two masks m when transmitting a message signal. One of the two masks can be used for the in phase (I) channel and one can be used for the out of phase (Q) channel.

In order to practice the transmission method of the present invention, the new masks m can be generated using linear feedback shift registers (LFSR). A $2^k$-ary LFSR sequence s[t] is a sequence having a having symbols $\{0, 1 \ldots, 2^k-1\}$ where k is limited to the value 1 in the binary case and two in the quaternary case. The sequence satisfies a linear recurrence relationship of the form:

$$\sum_{i=0}^{r} c_i s(t+i) = 0 (mod\ 2^k), \forall\ t > 0 \quad (11)$$

where $r \geq 1$ is the degree of the recursion. The coefficients $c_i$ belong to the set $\{0, 1, \ldots, 2^{k-1}\}$ and $c_r \neq 0$. This type of sequence s[t] has a characteristic polynomial:

$$c(x) = \sum_{i=0}^{r} c_i x^i \quad (12)$$

When k=1, the sequence s[t] is periodic with a period that is less than or equal to $2^r-1$. If the period of the sequence s[t] reaches the maximum value: $2^r-1$, the characteristic polynomial of s[t] is defined as a primitive polynomial and the sequence s[t] is an m-sequence. Sequences of this type are taught in S. W. Golomb, "Shift Register Sequences," Holden Day, San Francisco, Calif., 1967.

A code C' includes one period of an m-sequence and one period of each of its cyclic shifts. Thus, the size of the code C' is $2^r-1$. The code C' can then be extended by appending a zero bit to each code word in C'. The zero is appended at the same bit location of each code word. The inclusion of an all zero vector in this manner forms the code matrix C form the code C'.

The code matrix C has a length $2^r$ and a size $2^r$. In one embodiment the code C can be column-wise and row-wise permuted to create the Walsh code $W_{b,2^r}$, of size $2^r$. However, it is sufficient to obtain permutation matrix P such that the set of row vectors of the matrix product CP are the same as the set of row vectors of $W_{b,2^r}$.

Figure 9:
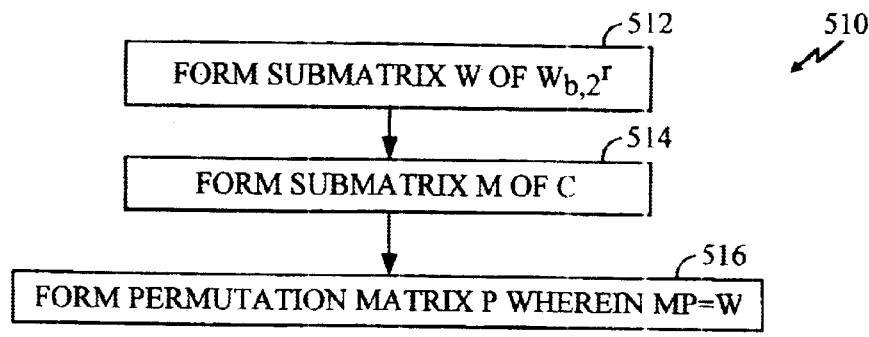
FIG. 9 shows a block diagram representation of a permutation matrix algorithm suitable for use in the method of the present invention.

Referring now to FIG. 9, there is shown permutation matrix algorithm 510, which is suitable for use in the present invention. In permutation matrix algorithm 510 a submatrix W of matrix $W_{b,2^r}$ is formed as shown in block 512. The submatrix W includes r rows having indices $1, 2, 4, \ldots, 2^{r-1}$. Note that the indexing of $W_{b,2^r}$ is zero based and ranges from 0 to $2^r-1$. Matrix W therefore has r rows and $2^r$ columns. Every column of matrix W is distinct from all of the other columns.

A submatrix M of code matrix C is then formed as shown in block 14 of permutation matrix algorithm 510. Submatrix M has r rows and $2^r$ columns. In order to form submatrix M an intermediate submatrix M' having r rows and $2^r-1$ columns is formed. Submatrix M' is formed by adding a column containing all zeros to submatrix M. The first row of submatrix M' can be any cyclic shift of the m-sequence used in constructing code C. The r−1 rows of submatrix M' following the first row are successive shifts by one time unit in each case beginning with the first row. Every column of submatrix M is distinct.

A permutation matrix P such that MP=W is then determined as set forth in block 516 of permutation matrix algorithm 510. Permutation matrix P is the required output of algorithm 510. Because submatrices M and W have the same set of distinct columns the determination of P in this manner is straightforward. In an alternate embodiment of the invention permutation matrix P can be determined using a matrix computation technique. It will be understood by those skilled in the art that the rows of the matrix CP are the same as the rows of $W_{b,2^r}$.

When k=2, and sequences therefore have a quaternary alphabet, a sequence known as Family A can be determined. The Family A sequence is taught, for example, in S. Boztas, P. V. Kumar, R, Hammons, "4-Phase Sequences with Near-Optimum Correlation Properties," IEEE Transactions on Information Theory, IT-38 No. 3 (May 1992), pp 1101–1113. In order to obtain a Family A sequence, let c(y) be a binary primitive polynomial of degree r. A polynomial g(x) having coefficients in the set $\{0, 1, 2, 3\}$ can be lifted from the polynomial c(x) as follows:

$$g(x^2)=(-1)^r c(x)c(-x)(mod\ 4) \quad (13)$$

Such a lift of the binary polynomial c(x) to the quaternary polynomial g(x) is a special case of the Hensel lift of polynomials. For example, see B, R, MacDonald, "Finite Rings with Identity," Marcel Dekker, Inc., New York, 1974. The LFSR sequence with the characteristic polynomial g(x) is defined to be a Family A sequence. The sequence has a period $2^r-1$.

Figure 10:
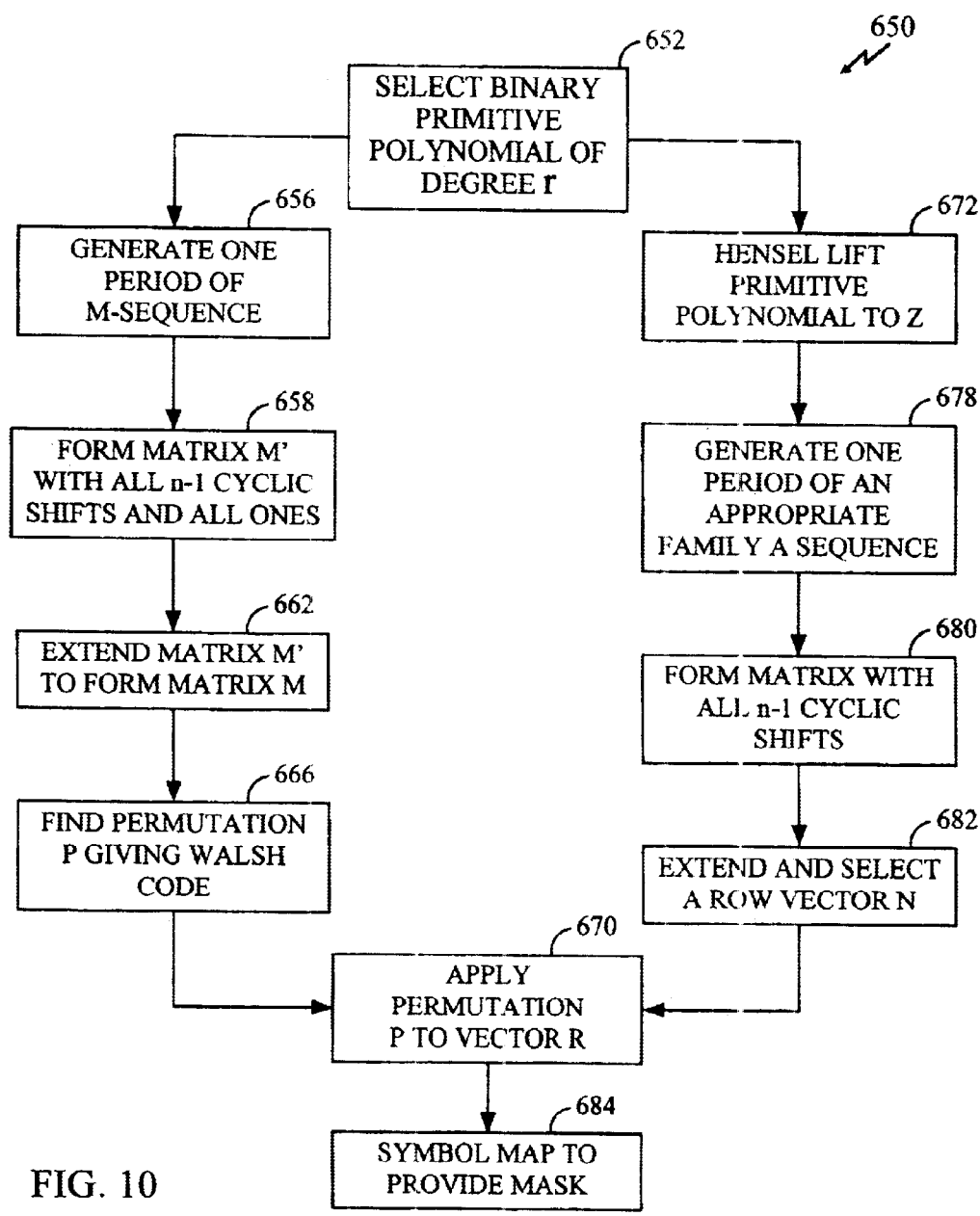
FIG. 10 shows a block diagram representation of the quasi-orthogonal mask generation algorithm of the present invention.

Referring now to FIG. 10, there is shown quasi orthogonal mask generation algorithm 650. Quasi-orthogonal mask generation algorithm 650 can be used to construct 4-phase masks for forming quasi orthogonal vectors of length $2^r$. In mask generation algorithm 650 a binary primitive polynomial c(x) of degree r is provided as shown in block 652. Using primitive polynomial c(x) as its characteristic polynomial, a period of an m-sequence is constructed as shown in block 56.

Matrix M' having dimensions $(2^r-1) \times (2^r-1)$ for the case where $n=2^r$ s constructed as shown in block 658. The rows of matrix M each contain a period of the m-sequence of block 656 along with all of its cyclic shifts. Matrix M' is then extended to form matrix M as shown in block 662. The extension of matrix M' is performed by adding an all zero column and an all zero row to matrix M'. The dimensions of matrix M are therefore $2^r \times 2^r$. For convenience, the first column of matrix M can be the all zero column. As set forth in block 656 a permutation P is found which column permutes the matrix M to contain the same row vectors as those contained in $W_{b,2^r}$. The permutation matrix method taught above, or any other method known to those skilled in the art, can be used to perform the operations of block 656.

A Hensel lift is then performed on the primitive polynomial c(x) obtained in block 652 of mask generation algorithm 650 to provide the polynomial g(x) as described hereinabove. The Hensel lift operation is shown in block 672. One period of the Family A sequences with the polynomial g(x) as its characteristic polynomial is generated as shown in block 678. A sequence of the Family A sequences is selected. The selected sequence can be any one of the Family A sequences having at least one symbol equal to 1 or 3.

A vector N' of length $(2^r-1)$ is constructed. The vector N' consists of a period of the Family A sequence selected according to block 678. A vector N of length $2^r$ is formed by appending a zero bit at the first bit location to vector N'. As shown in block 70 the vector N is then column permuted using the permute P found in block 666. The resulting permuted code word can be used as a masking function for generating quasi-orthogonal vectors according to the method of the present invention. The quasi-orthogonal vectors generated in this manner can be used with symbol mapping to (+1, −1, +j, −j). A total of 127 masks can be generated in this manner for a length 128 Walsh code. Two of the masks generated according to quasi-orthogonal mask algorithm 650 are set forth in Table I.

TABLE I

[1j1j1j1j1j1j1j1j1j1j1j1j-1-j-1-j-1-j-1-j1j1j-1-j-1-j1j1j-1-j-
1-j1j1j-1-j-1-j-1-j-1-j1j1j1j-1-j1j-1-j1j-1-j1j-1-j1j-1-
j1j-1-j-1-j1j-1-j1j1j-1-j-1-j1j1j-1-j-1-j1j1j-1-j-1-j1j-
1-j1j1j-1-j]
[1j1j1j1j-1-j-1-j1j1j-1-j1j-1-j1j-1-j-1-j1j1-j1-j-1j-1j-
1j-1j-1j-1j1-j-1j1j1-j-1-j1j-j-1j-j1j-1j1j-1-j1-j1j-
1-j1-j1-j1-j1-j1j-1j-1j1j-1-j-1-j1-j-1j1-j-1j1j1j1-j-1-
j-1j1j1j1j1]

Next, the masking functions obtained above are further processed (permuted) to achieve optimal correlation with shorter length Walsh codes for fat pipe or orthogonal variable length functions usage while retaining their optimal correlation with the Walsh code of same length. Orthogonal variable length sequences are known in the art and are described in detail in U.S. Pat. No. 5,751,761, entitled "SYSTEM AND METHOD FOR ORTHOGONAL SPREAD SPECTRUM SEQUENCE GENERATION IN VARIABLE DATA RATE SYSTEMS", and is further disclosed in the TIA "cdma2000 Candidate Submission to the ITU".

To provide an example of a set of permutations which can be carried out to masking functions obtained above without losing the optimal correlation with the fixed length (same length as the masking functions) Walsh code, we note that the Walsh code is a sub-code of the first order Reed-Muller codes Thus, any permutation from within the automorphism group of the first order Reed-Muller codes of same length may be applied to these masking functions which will leave the maximum absolute value of the correlation with the Walsh code of same length unchanged. These permutations may be applied systematically so as to obtain new masking functions optimal for fat pipe usage. We now let n (n is an integer power of 2) be the length of the masking function. For purposes of the present discussion, consider a block b=[$b_{t+1}, b_{t+2}, \ldots, b_{t+L}$] of length $2^m \cdot L$ chips. Here L (L≧4) is an integer power of 2, and each sub-block $b_{t+i}$ (1≦i≦L) has the same length $2^m$ chips, where m (≧0) is an integer. The block $$b^{(R)}(m) = \left[ b_{t+1}, b_{t+\frac{L}{2}+2}, b_{t+3}, b_{t+\frac{L}{2}+4}, \ldots, b_{t+\frac{L}{2}-1}, \right. \quad (14)$$

$$\left. b_{t+L}, b_{t+\frac{L}{2}+1}, b_{t+2}, b_{t+\frac{L}{2}+3}, b_{t+4}, \ldots, b_{t+L-1}, b_{t+\frac{L}{2}} \right]$$

will be referred to as a reflection of the block b with parameter m.

Let $\underline{v}=[v_1, \ldots, v_n]$ be a masking function. Let m, 0≦M≦log$_2$ n, be an integer. Then $\underline{v}$ may be expressed in terms of its sub-blocks of length $2^m$ as follows:

$$\underline{v}=[\underline{v}_{1:2^m}, \underline{v}_{2^m+1:2^{m+1}}, \ldots, \underline{v}_{n-2^m+1:n}]. \quad (15)$$

Let r (4≦r≦n) be an integer power of 2. The vector $\underline{v}^{(TR)}(m,r)=[\underline{v}_{t:r}^{(R)}(m), \underline{v}_{r+1:2r}^{(R)}(m), \ldots, \underline{v}_{n-r+1:n}^{(R)}(m)]$ will be referred to as the Total Reflection of $\underline{v}$ with parameters (m,r).

The steps described below may be used to construct masking functions giving QOFs that are optimal for fat pipe usage:

1) Begin with the 4-phase masking function $\underline{v}^{(1)}$ as constructed above which has optimal correlation properties with the Walsh code of length n.
2) Check if the sub-blocks of length $2^k$, with k initialized to 1, of $\underline{v}^{(1)}$ have optimal correlation with the Walsh code of length 2.
   a) If $\underline{v}^{(1)}$ has optimal correlation with the Walsh code of length 2, set $\underline{v}^{(k-1)}=\underline{v}^{(1)}$, k=k+1, and goto (3.).
   b) If not, test $\underline{v}^{(TR)}(0,r)$, for every possible choice of r (which is an integer power of 2), 4≦r≦n, until for some value r=r', $\underline{v}^{(TR)}(0,r')$ has optimal correlation with the Walsh code of length 2. Then, set $\underline{v}^{(k+1)}=\underline{v}^{(TR)}(0,r')$, k =k+1, and goto (3.).
3) Check if the sub-blocks of length $2^k$ of $\underline{v}^{(k)}$ have optimal correlation with the Walsh code of length $2^k$.
   a) If $\underline{v}^{(k)}$ has optimal correlation with the Walsh code of length $2^k$, set $\underline{v}^{(k+1)}=\underline{v}^{(k)}$, k=k+1. If k=log$_2$ n, goto (4.) else iterate another loop of (3.).
   b) If not, test $\underline{v}^{(TR)}(2^{k-1}, r)$ for each choice of r, $2^k$≦r≦n, until for some value r=r", $\underline{v}^{(TR)}(2^{k-1},r")$ has optimal correlation with the Walsh code of length $2^k$. Then, set $\underline{v}^{(k+1)}=\underline{v}^{(TR)}(2^{k-1},r")$, k=k+1. If k=log$_2$ n, goto (4.) else iterate another loop of (3.).
4) The mask $\underline{v}^{(\log^2 n)}$ is the required masking function of length n which is optimal for fat pipe usage.

Note above that a total of up to log$_2$ n−1 iterations of Step 3 may be needed to obtain the masking functions that are optimal for fat pipe usage.

Using these steps, it is possible to obtain QOFs which are optimal for fat pipe usage. These steps were carried out to the 2 examples for masking functions of length 128 which were given above. The following are the two resulting masking functions which are fat-pipe optimal:
[1j1−j1j−1j1j1−j−1−j 1−j1j1−j1j−1j−1−j−1j 1j−1j1j1−j−1−
j1−j1j1−j1j−1j1j1−j −1−j1j−1−j−1j−1−j1−j 1j−1j1j1−
j1j−1j−1−j−1j1j1−j 1j1−j−1j1−j1j1−j1j−1−j1j−
1j1j1−j1j−1j−1−j−1j−1j1−j−1−j−1j].

Rotating the above mask by 45 degrees to obtain a constellation with points={±1±j}, the corresponding I-Channel and Q-Channel QOF masks corresponding to the above are as below (in hexadecimal notation):

QOF$_I$=[474847b7484748b8747b74847b747b8b],
QOF$_Q$=[121d12e21d121ded212e21d12e212ede].
[1jj−1−j11j−1−j−j1−j11j−j1−1−j1j−j1−j1−1−j−1−jj−1j11−
  j−1jj1−j−1−1j−1jj11−jj1−j−11−j1−jj1j1−1j−j11j1jj−1j−
  1−1−j1jj−11j−j1−j1−1−j1j−j1j −11j1−j−j−1−j−1−1j−
  1jj1−j−1−1jj1−1j−1j−j−1j1−1j1−jj1].

Again rotating this mask by 45 degrees to obtain the IS95C constellation points={±1±j}, the corresponding I-Channel and Q-Channel QOF masks corresponding to the above are as below (in hexadecimal notation):
QOF$_I$=[7181242b8e7e242b17e7424d17e7bdb2],
QOF$_Q$=[18e8b2bd18e84d4281712b247e8e2b24].

The following two masks of length 256 provide examples of QOF masks, using the methods presented in this document, which are fat pipe optimal for variable length Walsh codes up to length 256:
[1jj−11j−j11jj−1−1−jj−11j−j11jj−11j−j1−1−j−j11−jj11−j−j−
  11−jj1−1jj11−j−j−11−jj 11−j−j−1−1j−j−11jj−11j−j11jj−
  1−1−jj−11j−j11jj−11j−j1−1−j−j1−1j−j−1−1jj1−1j−j−11−
  j−j−1−1jj1−1j−j−1−1jj11−jj11jj−11j−j11jj−1−1−jj−11j−
  j11jj−11j−j1−1−j11−jj11−j−j11−jj1−1jj11−j−j−11−
  jj11−j−j−1−1j−j−1−1−j1−1−jj−1−1−j11j−j1−1−jj−1−
  1−j−j1−1−jj−11jj−11−jj11−j−11−jj1−1jj11−j−j−11−
  jj11−j−j−1−1j−j−1].
Rotating the above mask by 45 degrees to obtain the IS-95C constellation points={±1±j}, the corresponding I-Channel and Q-Channel QOF masks corresponding to the above are as below (in hexadecimal notation):
QOF$_I$ =
  [747b4748212e121d747b4748ded1ede2747b4748212e12
  1d8b84b8b7212e121d],
QOF$_Q$ =
  [121d212e4748747b121d212eb8b78b8421d212e4748747
  bede2ded14748747b].
[1j−j11jj−11−jj11−j−j−11j−j11jj−1−1j−j−1−1jj1−1jj11−
  jj11jj−1−1−jj−11j−j−1−1j−j−11jj−1−1−jj−1−1−jj−11jj−
  11−jj1−1jj11j−j1−1−j−j11−jj1−1jj11−j−j−11−jj11jj−11j−
  j11−j−j−11−jj1−1−j−j1−1−jj−11−jj1−1j11j−j1−1−j−j1−
  1j−j−11−j−j−11j−j1−1−j11jj−11j−j−1jj1−1j−j−11jj−
  11j−j11j−j−j−11−jj11−jj11−j−j−1−jj−1−1−j11−jj11−j−
  j−11j−j11jj−11j−j−1−jj−11−j−j−1−1j−j−1−1−j11j−
  j11−j−j−1−1j−j−1].
Again rotating the above mask by 45 degrees to obtain the constellation points={1±j}, the corresponding I-Channel and Q-Channel QOF masks corresponding to the above are as below (in hexadecimal notation):
QOF$_I$ =
  [472147dee27b1d7bb72e482e1274128b2e48d14874ed74
  1221b821477b1d]
QOF$_Q$ =
  [214721b8841d7b1dd1482e48741274ed482eb72e128b12
  7447de47211d7be27b].

As described above a set of quasi-orthogonal vectors can be generated that are maximally uncorrelated with the Walsh functions used to generate the auxiliary pilot channels. The method described above generates complex quasi-orthogonal functions. In the present invention only the real portion of the complex quasi-orthogonal function is used to determine the phase of the auxiliary pilot. Because of their correlation properties to the auxiliary Walsh functions, these quasi-orthogonal functions can be used to minimize the peak to average ratio in a very efficient manner. This third embodiment is actually an optimized version of the first embodiment. The phase rotation is selected in accordance with the quasi-orthogonal function and the phase rotation is simply a one hundred and eighty degree or zero degree rotation of the auxiliary pilot channel.

Figure 8:
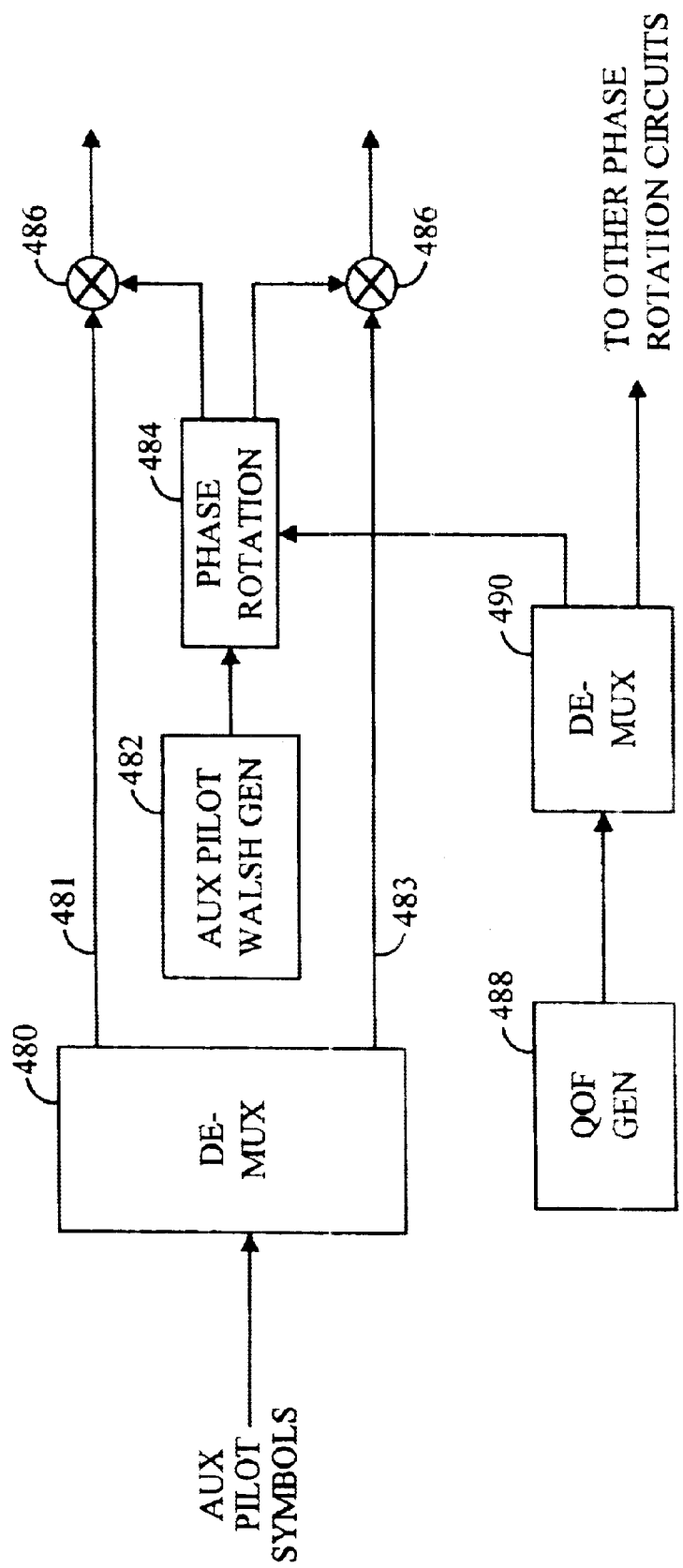
FIG. 8 is a block diagram of the third exemplary embodiment of the auxiliary pilot generator of the present invention using quasi orthogonal codes to determine the phase shift.

FIG. 8 illustrates a third exemplary embodiment of auxiliary, pilot modulator 100, which addresses the problem described above of bits in the auxiliary pilot channels adding constructively. Pilot symbols, which in the exemplary embodiment are the all zeroes sequence are provided to de-multiplexer 480. De-multiplexer 480 maps the input pilot symbols into a four point constellation consisting of the points (1,1), (1,−1), (−1,1) and (−1,−1) and outputs the mapped sequence onto two outputs 481 and 483. The symbol streams on outputs 481 and 483 are provided to orthogonal covering elements 486 and 488. Auxiliary pilot Walsh generator 482 generates the orthogonal covering sequence as described in equation (2) above and provides the orthogonal spreading sequence to phase rotation element 484. Phase rotation element 484 multiplies the auxiliary pilot spreading sequence by either a +1 or −1 value which is determined in accordance with a predetermined quasi-orthogonal spreading sequence. Quasi-orthogonal spreading function generator (QOF GEN) 488 generates a quasi orthogonal spreading function as described above. In the exemplary embodiment, quasi-orthogonal spreading function generator (QOF GEN) 488 generates a quasi-orthogonal function that is of a length or number of symbols equal to the length of the auxiliary pilot sequence. Thus, if the auxiliary pilot sequences are 256 symbols in length, quasi-orthogonal spreading function generator (QOF GEN) 488 generates a quasi-orthogonal function of 256 symbols.

Quasi-orthogonal spreading function generator (QOF GEN) 488 provides the quasi-orthogonal function to demultiplexer 490. Demultiplexer extracts a single bit (of value +1 or −1) from the sequence and provides that bit to phase rotation element 484. Phase rotation element 484 changes the phase of the auxiliary pilot sequence in accordance with the symbol from the quasi-orthogonal function by simply multiplying the auxiliary pilot channel sequence by the symbol from quasi orthogonal function generator demultiplexer 490. Demultiplexer 490 provides a different symbol from the quasi-orthogonal function from quasi-orthogonal spreading function generator (QOF GEN) 488 to each auxiliary pilot generator.

The demodulation using auxiliary pilot channels phase rotated in accordance with the quasi orthogonal functions can be performed as described with respect to the first embodiment of the present invention.

V. Auxiliary pilot signals from Quasi-orthogonal functions

In the preceding descriptions, the auxiliary pilot signals have been constructed from Walsh functions. The present invention is also applicable to the case where Walsh functions are constructed from quasi-orthogonal functions or from a concatenation of quasi orthogonal functions and their complements. Each of the embodiments described, above is directly applicable to avoiding symbol accumulation of the auxiliary pilots derived from quasi orthogonal functions.

The methods described above provide a method for generating a complete set of quasi orthogonal functions. Thus when the auxiliary pilots are generated from quasi orthogonal functions the optimal phase shift to provide minimum symbol accumulation is derived as discussed above simply by using a same or different quasi orthogonal function.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus; the present invention is not intended to be limited to the embodiments shown herein but is to be accorded the widest scope consistent with the principles and novel features disclosed herein.

We claim:

1. A base station comprising:
    a plurality of pilot generator means for generating a plurality of pilot signals including a common pilot and a plurality of auxiliary pilot signals, wherein each of the pilot signals is composed of a plurality of pilot symbols; and
    symbol accumulation reduction means for varying at least one of said pilot signals.

2. The base station of claim 1, wherein said symbol accumulation reduction means comprises a phase rotation means for altering the phase of said at least one of said pilot signals.

3. The base station of claim 2 wherein said phase rotation means varies, the phase of said at least one of said pilot signals by multiplying that signal by −1.

4. A base station comprising:
    a plurality of pilot generator means for generating a plurality of pilot signals wherein each pilot signal is composed of a plurality of pilot symbols;
    symbol accumulation reduction means for varying at least one of said pilot signals, the symbol accumulation reduction means comprising a phase rotation means for altering the phase of said at least one of said pilot signals; and
    a plurality of traffic modulator means for modulating at least one traffic signal for each of said pilot signals and wherein at least one of said traffic modulator means alters the phase of at least one of said traffic signals in accordance with the phase alteration of a corresponding pilot signal.

5. The base station of claim 1 wherein said symbol accumulation reduction means comprises an attenuation means for reducing the energy of at least one of the pilot symbols in said plurality of pilot signals.

6. A base station comprising:
    a plurality of pilot generator means for generating a plurality of pilot signals wherein each pilot signal is composed of a plurality of pilot symbols; and
    symbol accumulation reduction means for varying at least one of said pilot signals, said symbol accumulation reduction means comprising symbol attenuation means for reducing the energy of at least one of the pilot symbols in said plurality of pilot signals by gating off said at least one of the pilot symbols.

7. A base station comprising:
    a plurality of pilot generator means for generating a plurality of pilot signals wherein each of the pilot signals is composed of a plurality of pilot symbols, and wherein said pilot signals are generated as a concatenation of Walsh sequences and the complements of Walsh sequences; and
    symbol accumulation reduction means for varying at least one of said pilot signals.

8. A base station comprising:
    a plurality of pilot generator means for generating a plurality of pilot signals wherein each pilot signal is composed of a plurality of pilot symbols; and
    symbol accumulation reduction means for varying at least one of said pilot signals, the symbol accumulation reduction means comprising a phase rotation means for altering the phase of said at least one of said pilot signals, wherein said phase rotation of each of said at least one of said pilot signals is determined in accordance with a quasi orthogonal function.

9. The base station of claim 10 wherein said quasi orthogonal function is a binary orthogonal function.

10. The base station of claim 8 wherein said quasi orthogonal function is a quasi orthogonal function that is selected to be optimal for a shortened Walsh sequence.

11. A mobile station comprising:
    means for receiving a pilot signal;
    means for inserting into said pilot signal an estimate of a reduced symbol energy in said pilot signal to provide an improved estimate of said pilot signal;
    means for receiving a traffic signal; and
    means for demodulating said traffic signal in accordance with said improved estimate of said pilot signal.

12. In a base station in which a plurality of pilot signals are simultaneously transmitted, a method for transmitting said pilot signals comprising the steps of:
    generating a plurality of pilot signals including a common pilot and a plurality of auxiliary pilot signals, wherein each of the pilot signals is composed of a plurality of pilot symbols; and
    altering at least one of said pilot signals to reduce symbol accumulation in said plurality of pilot signals.

13. The method of claim 12 wherein said step of altering at least one of said pilot signals to reduce symbol accumulation comprises altering the phase of said at least one of said pilot signals.

14. The method of claim 13 wherein said step of altering the phase of said at lease one of said pilot signals comprises varying the phase of said at least one of said pilot signals by multiplying that signal by −1.

15. In a base station in which a plurality of pilot signals are simultaneously transmitted, a method for transmitting said pilot signals comprising the steps of:
    generating a plurality of pilot signals wherein each of the pilot signals is composed of a plurality of pilot symbols;
    altering the phase of at least one of said pilot signals to reduce symbol accumulation in said plurality of pilot signals;
    modulating at least one traffic signal for each of said pilot signals; and
    altering the phase of at least one of said traffic signals in accordance with the phase alteration of a corresponding pilot signal.

16. The method of claim 12 wherein said step of altering at least one of said pilot signals to reduce symbol accumulation in said plurality of pilot signals comprises reducing the energy of at least one of the pilot symbols in said plurality of pilot signals.

17. In a base station in which a plurality of pilot signals are simultaneously transmitted, a method for transmitting said pilot signals comprising the steps of:
    generating a plurality of pilot signals wherein each pilot signal is composed of a plurality of pilot symbols; and
    altering at least one of said pilot signals to reduce symbol accumulation in said plurality of pilot signals by reducing the energy of at least one of the pilot symbols in said plurality of pilot signals, the energy reduction of said at least one of the pilot symbols comprising gating off said at least one of the pilot symbols.

18. In a base station in which a plurality of pilot signals are simultaneously transmitted, a method for transmitting said pilot signals comprising the steps of:

generating a plurality of pilot signals wherein each pilot signal is composed of a plurality of pilot symbols, and wherein said pilot signals are generated as a concatenation of Walsh sequences and the complements of Walsh sequences; and altering at least one of said pilot signals to reduce symbol accumulation in said plurality of pilot signals.

19. In a base station in which a plurality of pilot signals are simultaneously transmitted, a method for transmitting said pilot signals comprising the steps of:

generating a plurality of pilot signals wherein each of the pilot signals is composed of a plurality of pilot symbols; and altering the phase of at least one of said pilot signals in accordance with a quasi orthogonal function to reduce symbol accumulation in said plurality of pilot signals.

20. The base station of claim 19 wherein said quasi orthogonal function is a binary orthogonal function.

21. The base station of claim 19 wherein said quasi orthogonal function is a quasi orthogonal function that is selected to be optimal for a shortened Walsh sequence.

22. In a mobile station, a method for receiving a signal from a base station which reduces the energy of selected signals in the pilot signals in order to reduce symbol accumulation, comprising the steps of:

receiving a pilot signal;

inserting into said pilot signal an estimate of a reduced symbol energy in said pilot signal to provide an improved estimate of said pilot signal;

receiving a traffic signal; and demodulating said traffic signal in accordance with said improved estimate of said pilot signal.

* * * * *